(12) United States Patent
Karoui et al.

(10) Patent No.: US 8,093,866 B2
(45) Date of Patent: Jan. 10, 2012

(54) METHOD FOR MANAGING CHARGING OF A RECHARGEABLE BATTERY

(75) Inventors: Fathia Karoui, Le Bourget du Lac (FR); Elisabeth Lemaire, Chimilin (FR); Christine Lefrou, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 441 days.

(21) Appl. No.: 12/312,027

(22) PCT Filed: Nov. 5, 2007

(86) PCT No.: PCT/FR2007/001821
§ 371 (c)(1),
(2), (4) Date: Apr. 23, 2009

(87) PCT Pub. No.: WO2008/065273
PCT Pub. Date: Jun. 5, 2008

(65) Prior Publication Data
US 2010/0060240 A1  Mar. 11, 2010

(30) Foreign Application Priority Data
Nov. 6, 2006  (FR) ..................... 06 09668

(51) Int. Cl.
*H02J 7/04* (2006.01)
*H02J 7/16* (2006.01)

(52) U.S. Cl. ........ 320/145; 320/141; 320/156; 320/161; 324/426

(58) Field of Classification Search ............... 320/145
See application file for complete search history.

(56) References Cited

U.S. PATENT DOCUMENTS

| | | | | |
|---|---|---|---|---|
| 5,686,815 A * | 11/1997 | Reipur et al. | ................. | 320/116 |
| 5,900,718 A * | 5/1999 | Tsenter | .................... | 320/151 |
| 6,191,560 B1 * | 2/2001 | Sakakibara | ................. | 320/150 |
| 6,577,107 B2 * | 6/2003 | Kechmire | .................... | 320/139 |
| 2004/0032237 A1 | 2/2004 | Dykeman | | |
| 2004/0257049 A1 * | 12/2004 | Trinh et al. | ................... | 320/145 |
| 2005/0134231 A1 | 6/2005 | Cho | | |
| 2008/0048623 A1 | 2/2008 | Le Gall et al. | | |

FOREIGN PATENT DOCUMENTS

| | | |
|---|---|---|
| FR | 2 870 391 A1 | 11/2005 |
| WO | WO 03/030331 A1 | 4/2003 |
| WO | WO 2005/101042 A1 | 10/2005 |
| WO | WO 2005/114808 A2 | 12/2005 |
| WO | WO 2005/122319 A1 | 12/2005 |

* cited by examiner

*Primary Examiner* — Arun Williams
(74) *Attorney, Agent, or Firm* — Oliff & Berridge, PLC

(57) ABSTRACT

The management method comprises a charging phase and may comprise an optional prior phase of estimating the state of charge of the battery. Comparison of the absolute value of the slope of the voltage at the battery terminals with a full-charge threshold at the end of each period, when a pulsed current is applied, is used as end-of-charging criterion in the charging phase and/or as full-charge criterion in the phase of estimating the state of charge. The charging phase by pulsed current is interrupted when the slope reaches the full-charge threshold. This same comparison constitutes the criterion for estimating the necessity for going to a charging step after the prior phase of estimating the state of charge of the battery.

6 Claims, 6 Drawing Sheets

METHOD FOR MANAGING CHARGING OF A RECHARGEABLE BATTERY

BACKGROUND OF THE INVENTION

The invention relates to a method for managing charging of a rechargeable battery, comprising at least one charging phase and possibly a prior phase of estimating the state of charge of the battery.

STATE OF THE ART

Charging or recharging of a battery is conventionally performed under the control of a charging controller. The various battery charging management methods used at present are based either on measuring the voltage at the battery terminals or on measuring the charging current of the battery, and differ by the end-of-charging criterion used A first known management mode is of On/Off type based on interruption of charging when the voltage reaches a high threshold and resuming charging when the voltage reaches a reconnection voltage threshold. In this easy-to-implement management mode, the voltage thresholds are often poorly adjusted and it is difficult to achieve full charging of the battery. Optimal adjustment of these voltage thresholds is in fact very delicate to achieve. Although these voltage thresholds take account of the battery technology or of the dimensioning of the system, they are nevertheless kept constant throughout the operational lifetime of the battery. The voltage of a battery does however depend both on its technology, but also on its operating conditions, i.e. the charging or discharging current, relaxation period, temperature, and finally on its state of health (SOH).

Another management mode called floating mode consists in applying a constant current up to a certain voltage value and in then maintaining this voltage for a certain time to complete charging of the battery. The time during which the current is maintained is not well optimized and this type of management, although it reduces the degassing phenomenon, for example for lead batteries, often leads to corrosion of the positive grid and therefore to degradation of the battery. The recharging time of the second phase remains very long as the current value is very low. The end-of-charging criterion is therefore not satisfactory and remains imprecise.

Other management methods are based on counting the amp-hours input to the battery. This management method consists in predetermining the quantity of charge to be supplied to the battery to recharge the latter fully. An overcharge coefficient is often applied to compensate the current used by nuisance reactions (for example that of water electrolysis in the case of batteries with an aqueous electrolyte) to the detriment of the main reaction. Optimizing the overcharge coefficient is very delicate and calculating the amp-hours remains imprecise due to current measurement drift. The end-of-charging criterion remains non-optimized, which leads in most cases to excessive overcharging of the battery leading to deterioration of the battery.

Another management method used in particular for boost-charging electric vehicles consists in using a pulsed current. For example the document US2004/0032237 describes a charging method by applying positive pulses and negative discharging pulses. The parameters of these pulses, i.e. pulse width and amplitude, are adjusted to maintain the charging voltage level at a maximum value of approximately 1V. The regulator uses the voltage as end-of-charging criterion. This criterion depends essentially on the state of health SOH of the battery and on its internal resistance, which makes it variable, imprecise and unsuitable. In another example, the document WO2005/114808 describes a charging management method by applying a periodic current in which the maximum polarization point is used as end-of-charging criterion. This point is calculated by subtracting two Gaussian filters of the voltage response. This method remains complicated and requires a powerful data analysis system.

Patent WO2005/101042 describes a method for estimating the state of charge (SOC) of a battery based for example on measurement of the voltage after a relaxation time. The drawback of this method is the necessity of knowing several parameters of the state of the battery: the internal resistance, relaxation voltage, voltage and current applied and the ratio between the power input and that input at the previous charging. The relaxation time can be fairly long, about 2 hours in the case of lead batteries, which presents a drawback for practical application of such a method. Although it presents a good precision for estimating the SOC of NiMH batteries, this method is difficult to apply in practice to form an end-of-charging criterion.

OBJECT OF THE INVENTION

The object of the invention consists in providing a method for managing charging of a rechargeable battery remedying the shortcomings of the prior art, in particular using an end-of-charging criterion and/or a state-of-charge estimation criterion that are simple, precise and quick.

According to the invention, this object is achieved by the appended claims and more particularly by the fact that the charging phase comprises at least:
- a charging step by periodic rectangular current pulses alternately taking alternately a first amplitude during a first period and a second amplitude during a second period,
- periodic measurement of the voltage at the battery terminals,
- calculation, from said voltage measurements, of a slope value representative of the voltage variation versus time,
- comparison of the absolute value of the slope at the end of each period with a predetermined full-charge threshold representative of full charge of the battery,
- and interrupting said charging step by current pulses when said absolute value of the slope is greater than or equal to said full-charge threshold.

The end-of-charging criterion used in this method is comparison of the absolute value of the slope of the voltage at the battery terminals measured when current pulses are applied, with a predetermined full-charge threshold.

It is a further object of the invention to provide a charging management method comprising a prior phase of estimating the state of charge of the battery in which the state-of-charge estimation criterion, i.e. the criterion for switching to the charging phase, is analogous to the previous one, i.e. comparison of the absolute value of the slope of the voltage at the battery terminals measured when current pulses are applied, with a predetermined full-charge threshold.

BRIEF DESCRIPTION OF THE DRAWINGS

Other advantages and features will become more clearly apparent from the following description of a particular embodiment of the invention given for non-restrictive example purposes only and represented in the appended drawings in which.

DESCRIPTION OF A PREFERRED EMBODIMENT OF THE INVENTION

In the preferred embodiment represented in the figures, a battery presenting a state of charge of less than 100% is charged in a charging phase that will be described hereafter. In this charging phase, represented in FIG. 1, the charging current I of the battery is a pulsed current between times A and B, after a current of constant amplitude I3 has been applied up to time A. The pulsed current is conventionally constituted by periodic rectangular current pulses alternately taking a first amplitude I1 during a first period t1 and a second amplitude I2, lower than the first amplitude, during a second period t2.

In the example illustrated, application of the constant current at a value I3 constitutes a charging step at constant current. This step is followed, after point A, by a charging step by current pulses at amplitudes I1 and I2. These two steps constitute the charging phase of the charging management method described herein.

Figure 1:
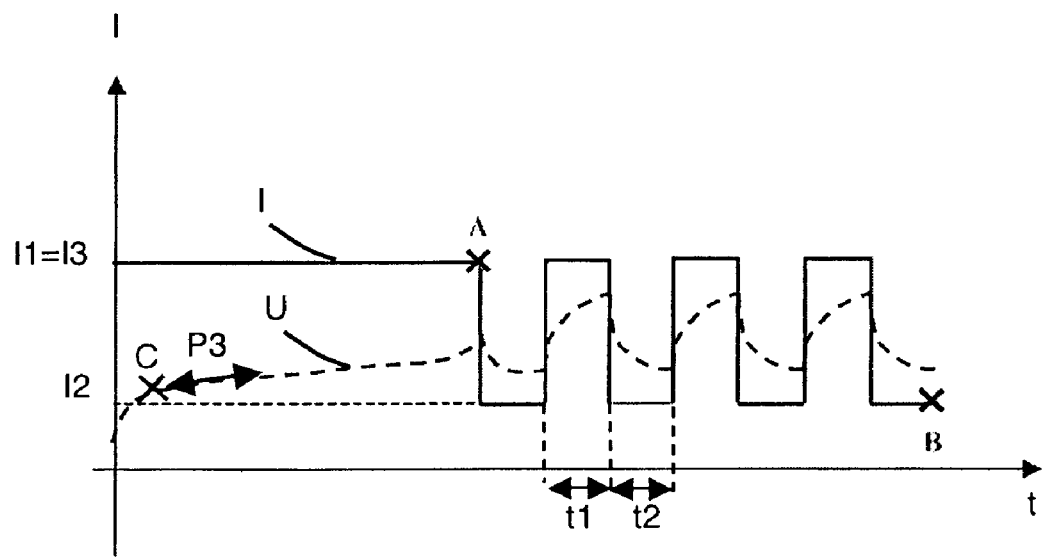
FIG. 1 schematically illustrates the variations versus time of the charging current I of a battery charged during the charging phase of the method according to the invention, as well as the corresponding variations of the voltage U.

As illustrated in FIG. 1, value I3 is equal to value I1, but in other embodiments, I3 can present a different value according to the required type of charging at constant current, to the type of battery or to the total required charging time.

Figure 2:
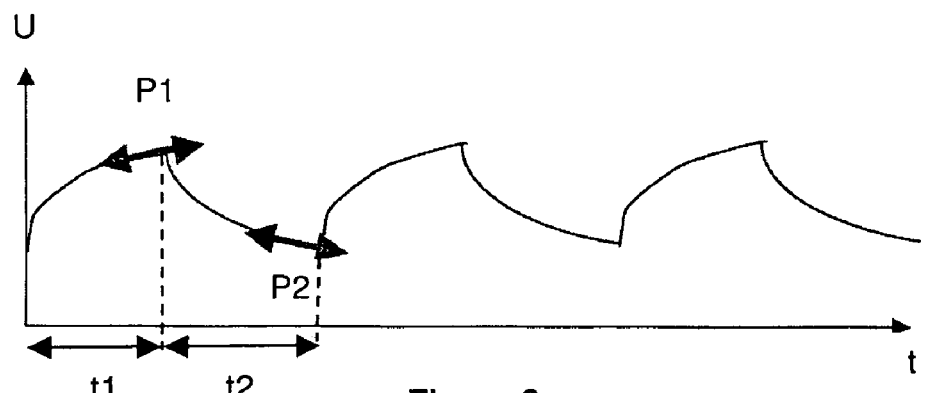
FIG. 2 illustrates the variations versus time of the voltage U at the terminals of the battery charged by the method according to the invention, during the charging step by current pulses.

As illustrated in FIG. 2, a slope value P of the voltage U measured periodically at the terminals of the battery to be charged is calculated at least at the end of each period t1, t2 (P1 at the end of period t1 and P2 at the end of period t2). The slope value P is representative of the variation of voltage U versus time. In practice, slope P is calculated periodically by any suitable means during the current pulse charging step, and only the values calculated at the end of the successive periods t1 and t2 are taken into account in the method.

To determine in real time whether the state of charge of the battery during the current pulse charging step corresponds to a fully charged state of the battery, the absolute value of slope P calculated above at the end of each period t1, t2 is compared with a predetermined full-charge threshold, for example 300 mV/s, representative of full charge of the battery. If the absolute value of slope P is greater than the full-charge threshold, the current pulse charging step is interrupted.

Figure 3:
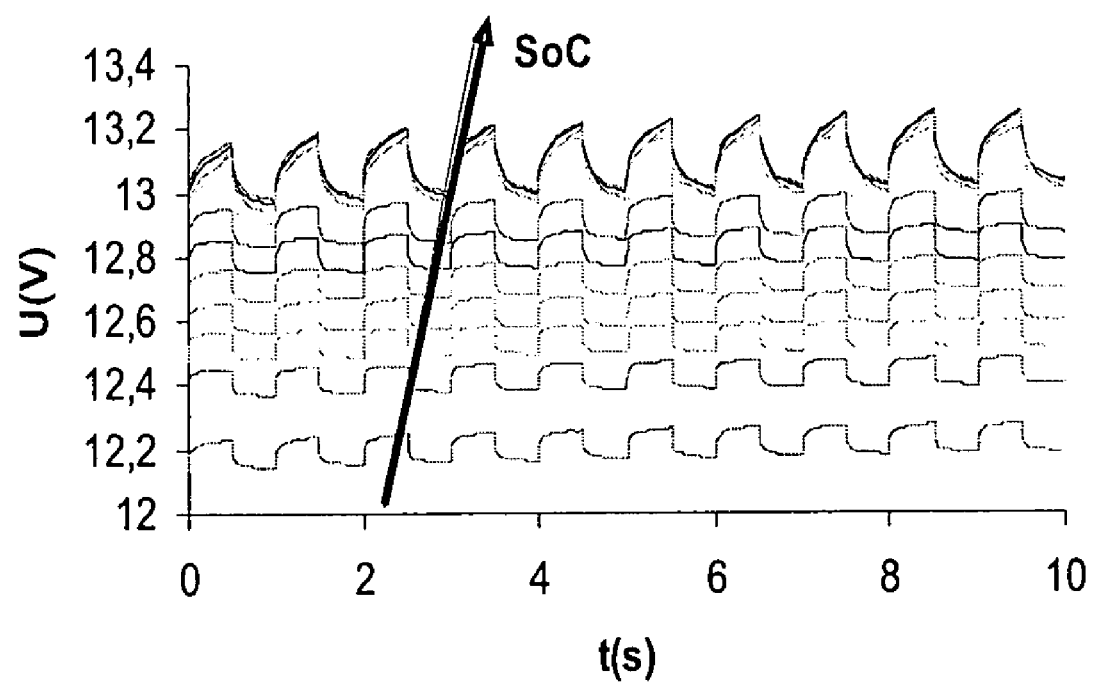
FIG. 3 illustrates the voltage response of batteries to current pulses for different states of charge.

As represented in FIG. 3, the form of the voltage response at the terminals of a battery, measured when current pulses are applied, does in fact vary according to the state of charge SOC of the latter. In particular, the absolute value of the slope at the end of each period increases with the state of charge SOC. In FIG. 3, the greater the state of charge SOC, the higher the mean value of the voltage response on the y-axis. The predetermined full-charge threshold corresponds to the absolute value of slope P when the state of charge SOC of the battery is 100% (see the curve plot the farthest to the top of the graph).

During the charging step at constant current I3, i.e. before point A of FIG. 1, slope value P (referenced P3 during this step) of the periodically measured voltage U is calculated periodically. After a predetermined time (typically 2 minutes with respect to application of I3) or a change of slope being recorded (after point C of FIG. 1), the absolute slope value P3 calculated is then compared with a predetermined range, for example comprised between 1 mV/s and 6 mV/s. Switching to the current pulse charging step (point A) takes place when the absolute value of P3 falls within said predetermined range.

FIGS. 4 to 7 illustrate an example of flowcharts of the above embodiment which can be implemented by any charging controller of known type.

Figure 4:
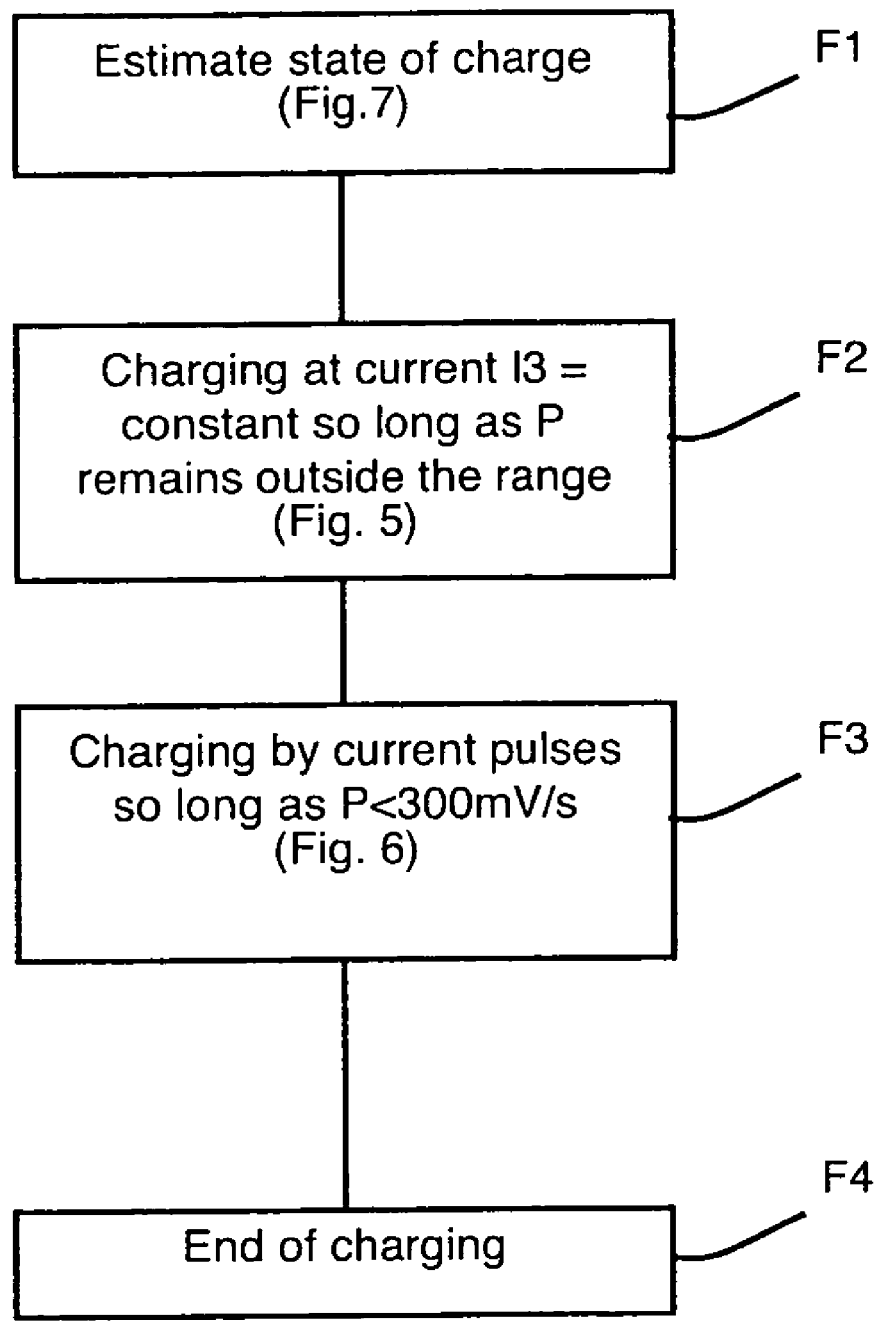
FIGS. 4 to 7 represent flowcharts of a preferred embodiment of the method according to the invention.
Figure 7:
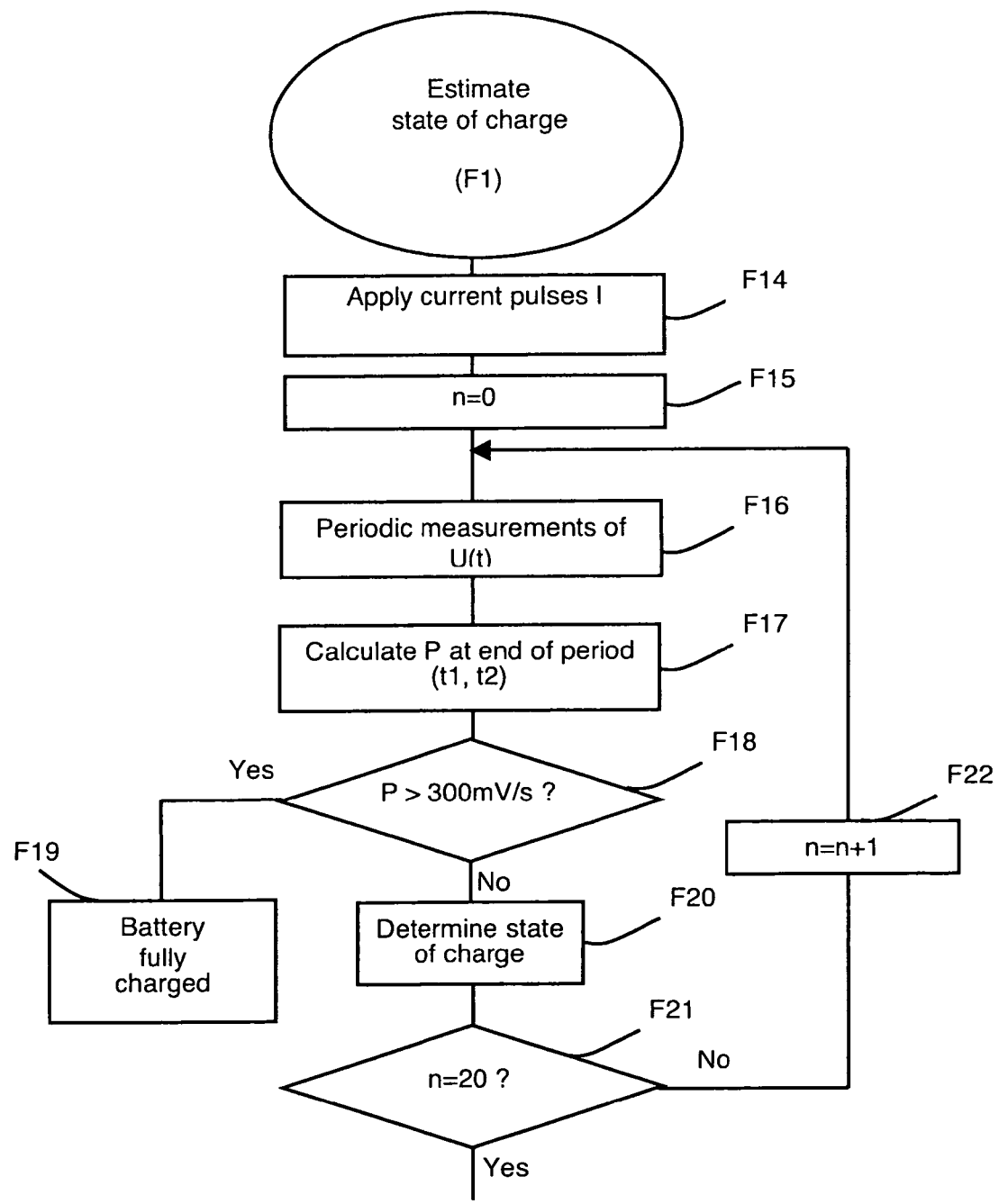

As illustrated in FIG. 4, in a first step F1 illustrated in greater detail in FIG. 7, the state of charge is estimated for a battery having a state of charge that is unknown so as to determine whether the charging controller has to apply the charging phase described above to this battery or not. The charging controller goes on to the next steps of the method if it finds that the battery is not fully charged.

In FIG. 4, after the step F1 of estimating the state of charge, the charging controller goes on to a step F2 of charging the battery at constant current at value I3 if it was determined in step F1 that the battery was not fully charged. The controller remains at step F2 so long as slope value P3 of the voltage measured periodically at the battery terminals remains, in absolute value, outside a predetermined range preferably comprised between 1 mV/s and 6 mV/s. Charging of the battery at constant current I3 is interrupted when the absolute slope value P3 of voltage U at the battery terminals enters the corresponding range.

When step F2 is interrupted by the absolute slope value P3 (or more generally P) entering the corresponding range, the controller controls charging of the battery with a pulsed current in a step F3. The pulsed current corresponds to application of periodic rectangular current pulses having a first amplitude I1 during a first period t1 and a second amplitude I2 during a second period t2. I2 is advantageously zero but it can also not be zero. Step F3 is performed by the controller so long as the absolute slope value P1, P2 (or more generally P) calculated at the end of each period t1, t2 remains below a predetermined full-charge threshold, preferably equal to 300 mV/s. This threshold corresponds physically, as explained before, to a state of charge SOC of the battery of the example equal to 100%.

When step F3 is interrupted by equalling or exceeding the absolute slope value P1, P2 (or more generally P) calculated at the end of each period t1, t2, with respect to the predetermined threshold of 300 mV/s, the controller goes on to an end-of-charging step F4 and the battery is considered to be fully charged.

Figure 5:
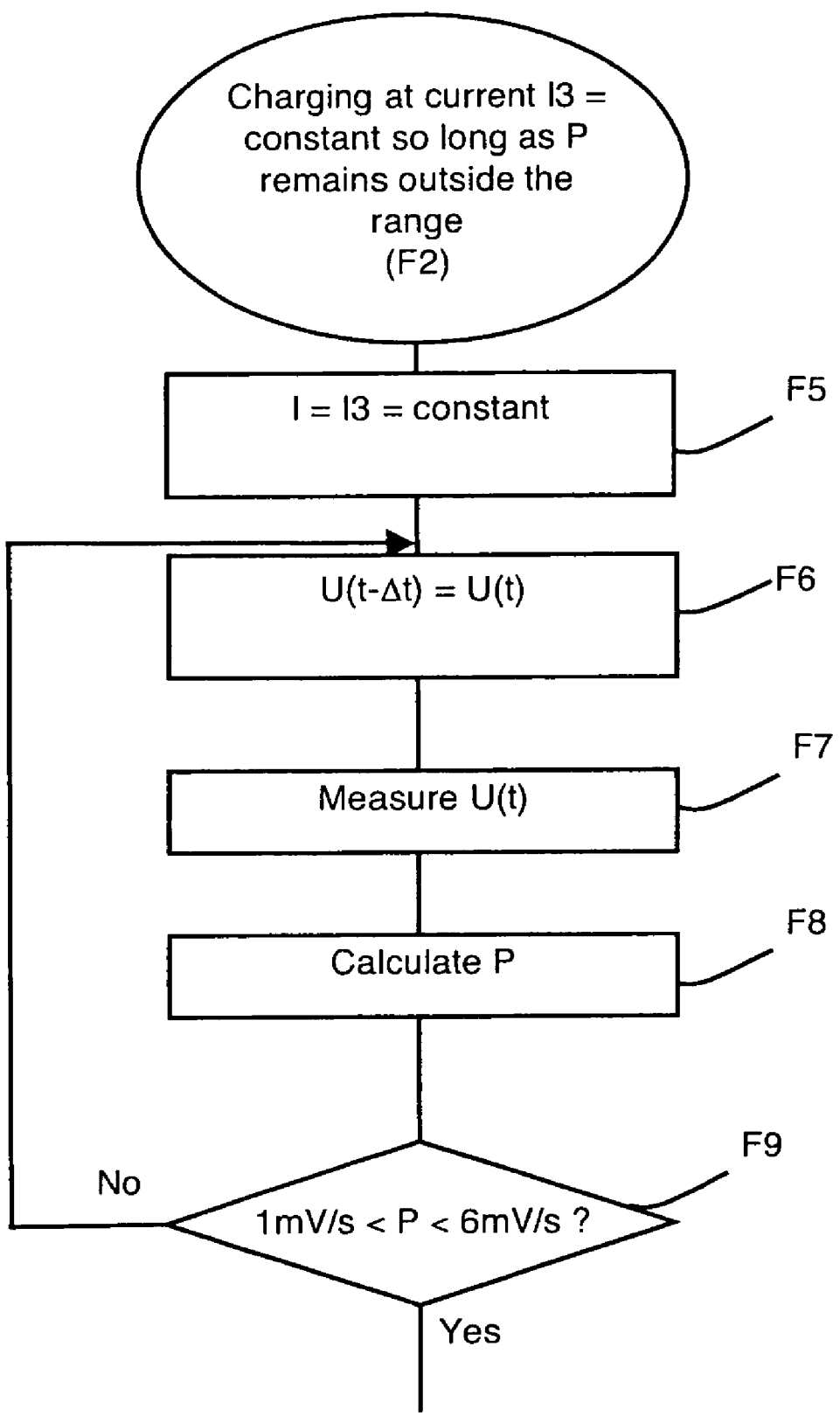
Figure 6:
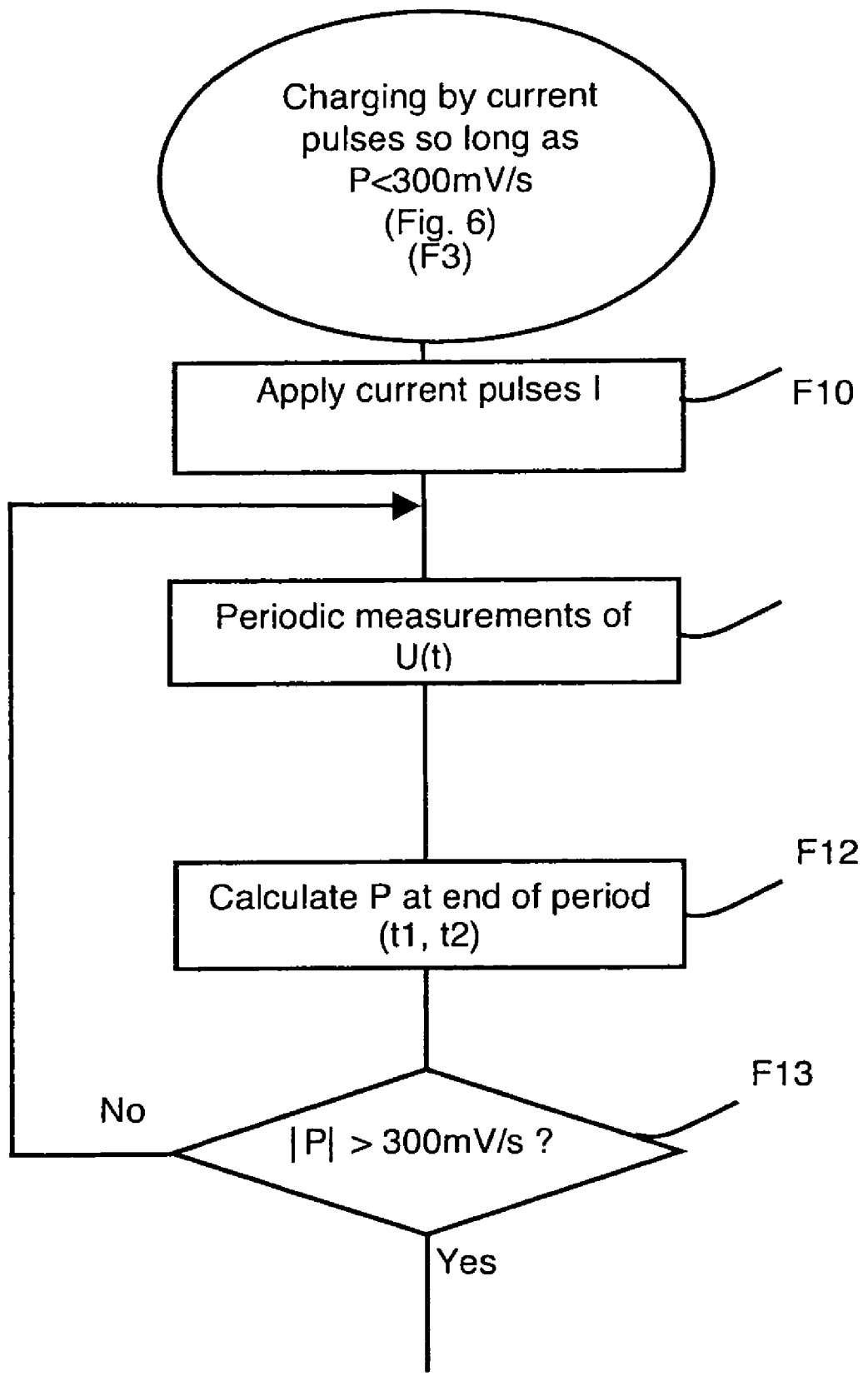

Embodiments of steps F1 to F3 are illustrated in greater detail respectively in FIGS. 7, 5 and 6.

As represented in FIG. 5, step F2 of charging at constant current I3 can first of all comprise, in a step F5, determination of the value I3 of charging current I according to the type of battery to be charged and to the application envisaged for this battery and/or to the required charging time. In the same step F5, the controller sets amplitude I of charging current to the value I3 previously determined in the same step (I=I3). Step F5 is followed by a step F6 in which the controller stores the previously measured voltage value U(t): U(t−Δt)=U(t). Then in a step F7, a new voltage measurement U(t) is recorded before calculating slope value P (i.e. P3 in FIG. 1) in a step F8. The absolute slope value P calculated is then compared, in a step F9, with a predetermined range of values. In FIG. 5 for example, the controller checks if the absolute slope value P is comprised between 1 mV/s and 6 mV/s. If this is not the case (No output of F9), the controller loops back to step F6. It therefore continues to apply the unchanged current of constant amplitude I3 to the battery and stores the previously measured voltage value before measuring a new voltage value to calculate a new value of P. The succession of steps F6 to F9 is repeated so long as slope value P remains outside the range and, throughout this charging step at constant current I3, the successive measurements of voltage U(t) are performed at predetermined time intervals Δt. The progression of voltage U in time obtained in this way is then optimal. Slope value P can then be calculated taking the absolute value of the ratio between the difference between two successive values of the measured voltage and of the time Δt elapsed between these two measurements:

$$P=|(U(t)-U(t-\Delta t))/\Delta t|.$$

When, in step F9, the controller notes that the absolute value of slope P has entered the predetermined range (Yes output of step F9), step F2 is terminated and the controller then goes on to step F3. As represented in FIG. 6, step F3 can begin by a step F10 in which the controller determines and applies values I1 and I2 of the amplitudes of the rectangular pulses of charging current I which is applied in current pulse charging step. These values I1 and I2 depend for example on the type of battery to be charged and on the application envisaged for this battery and/or on the required charging time.

As soon as the battery is subjected to the first current pulse (which, in the example illustrated in FIG. 1, corresponds to a pulse of amplitude I2), i.e. in this example at the beginning of first second period t2 (see FIG. 2 at the level of point A), the controller goes on to a step F11 in which the controller performs periodic measurements of voltage U(t) at the battery terminals in the course of charging. Voltage U(t) is then modified in response to the current pulses and the profile of U(t) is similar to the curve plot of FIG. 2 and to that of FIG. 1 after point A.

The controller then goes on to step F12 in which slope value P is calculated at the end of a period, here t2 (P2 of FIG. 2). The absolute value of slope value P calculated in step F12 at the end of period t2 is then compared in a step F13 with the full-charge threshold of 300 mV/s. If the absolute value of P is less than 300 mV/s (No output of F13), the controller loops back to step F11. The controller continues to apply the pulsed current to the battery and performs new measurements of voltage U(t) over the next period, here t1, to calculate a new value of P at the end of this period. The succession of steps F11 to F13 is repeated at the end of each period t1, t2 so long as the absolute value of slope value P is less than 300 mV/s and, throughout this pulsed current charging step, the successive measurements of voltage U(t) are performed at predetermined time intervals Δt.

When, in step F13, the controller notes that the absolute slope value P becomes greater than 300 mV/s (Yes output of step F13), step F3 is terminated and the controller then goes on to end-of-charging step F4 and the battery is considered to be fully charged.

In a first step F1 (FIG. 1), illustrated in greater detail in FIG. 7, the state of charge is estimated for a battery having a state of charge that is unknown so as to determine whether the charging controller has to apply steps F2 to F4, or more precisely steps F5 to F13, to this battery or not.

As illustrated in FIG. 7, step F1 of estimating the state of charge of the battery first of all comprises a step F14 in which the controller determines and applies the values of amplitudes I4 and I5 of rectangular pulses of a test current (not shown) which is applied in the phase of estimating the state of charge. The pulsed test current is conventionally formed by periodic rectangular current pulses alternately taking a first amplitude I4 during a first period t3 and a second amplitude I5, lower than first amplitude I4, during a second period t4. These values I4 and I5 depend for example on the type of battery to be charged and on the application envisaged for this battery. For example, I4 and I5 can respectively be equal to I1 and I2. t3 and t4 can likewise respectively be equal to t1 and t2.

As soon as the battery is subjected to the first test current pulse, the controller goes on to a step F15 in which a number n is reset to zero, and then to a step F16 in which the controller performs periodic measurements of voltage U(t) at the terminals of the battery being tested. Voltage U(t) then changes in response to the test current pulses of amplitudes I4, I5 and the profile U(t) is, in the same way as application of charging current pulses of amplitudes I1, I2, similar to the curve plot of FIG. 2 and to that of FIG. 1 after point A.

The controller then goes on to step F17 in which slope value P, representative of the voltage variation versus time, is calculated at the end of the period. The absolute value of slope value P calculated in step F17 at the end of first period t3 or t4 (depending on whether the test current applied begins with a pulse of amplitude I4 or with a pulse of amplitude I5) is then compared with the full-charge threshold of 300 mV/s in a step F18. If the absolute value of P is greater than 300 mV/s (Yes output of F18), the controller goes on to a step F19 corresponding to a state of charge of the battery of least 100%.

If on the other hand the absolute value of P is less than 300 mV/s (No output of F18), the controller goes on to a step F21 in which the controller checks whether the number n is equal to a predetermined number, for example 20. A step F20 can if necessary be inserted between steps F18 and F21 in which the state of charge of the tested battery is determined by comparing the absolute value of slope P, calculated in step 17, with a predetermined look-up table which associates the normal state of charge of a battery according to the absolute value of the slope of the voltage response, at the end of a period, to a pulsed current. This determination can correspond to decision-making criteria for subsequent operations to be carried out on the battery, such as for example boost charging or rehabilitation of the battery.

When the controller notes in step F21 that the number n is less than 20 (No output of step F21), it loops back to step F16 performing an incrementing step F22 of the number n (n=n+1) beforehand. The controller continues to apply the pulsed test current to the battery and makes new measurements of voltage U(t) over the next period to calculate a new value of P at the end of this period. The succession of steps F16 to F21 is repeated at the end of each period t3, t4 so long as the number n is less than 20.

When the controller notes in step F21 that the number n is equal to 20 (Yes output of step F21), step F1 is terminated and the controller then goes on to step F2 of charging at constant current I3 and the charging phase begins.

Step F1, which comprises for example steps F14 to F22, constitutes a phase of estimating the state of charge of the battery that has an unknown state of charge and may need charging. The principle of incrementing the number n is an embodiment that ensures that in practice the decision to go on to the charging phase is taken after a small number of test current pulses (20 in the above example), sufficient to avoid any risk of anomaly or error. For test pulses with a frequency of 1 Hz, threshold 20 for the number n corresponds to a time of 10 s for the phase of estimating the state of charge of the battery. It is thus possible to have a quick estimation of the state of charge of a battery.

In practical application of the method, during a period t1 to t4, the voltage first varies very quickly with a high absolute slope value P, and then presents at least one break of slope. Slope P (P1, P2, P3) to be taken into consideration in application of the method of the invention is that measured at the end of the period or more generally in the last part of the period after the break of slope. The decision of which slope to use for each period can be made as a function of time, or after a break of slope has been detected (which implies several slope measurements), or simply by taking the last measurement made during the period. The latter solution is the simplest to implement. Care should furthermore be taken to apply the same method on all the periods.

The charging management method described above thus comprises a charging step by current pulses comprising measurement of voltage U at the battery terminals, determination of slope P of voltage U at the end of each period, comparison of the absolute value of slope P of voltage U with a predetermined full-charge threshold and interruption of charging when the absolute value of slope P is greater than this threshold.

This charging management method, using, as end-of-charging criterion, the absolute value of slope P of voltage U at the battery terminals when a pulsed current I is applied, is preferably used with a prior phase of estimating the state of charge using the same criterion. It can nevertheless be used with other methods for estimating the state of charge using other criteria.

In parallel, the phase of estimating the charge described above, i.e. using the absolute value of the slope of the voltage response to a few test current pulses as criterion for estimating the state of charge, can be used in association with any type of charging management method, whether it uses the end-of-charging criterion described above or not.

The end-of-charging criterion of the charging management method and the criterion for switching to the charging phase in a prior phase of estimating the charge applied to a battery whose state of charge is unknown are therefore the same. In all cases, this criterion comprises comparison of the absolute value of the slope of the voltage at the battery terminals, measured when current pulses are applied, with a predetermined full-charge threshold.

Whereas in the document WO2005/122319, the different parameters (amplitude and duration of each period) of the pulsed charging current are continuously regulated by the voltage slope, to maintain slope P in a range comprised between 1 mV/s and 6 mV/s throughout the charging phase, according to the present invention, the value of the voltage slope is used as end-of-charging criterion and/or as criterion for estimating the state of charge.

The invention claimed is:

1. A method for managing charging of a rechargeable battery, comprising at least one charging phase comprising at least:
    charging said battery by periodic rectangular current pulses alternately taking a first amplitude during a first period and a second amplitude during a second period, the second amplitude being lower than the first,
    measuring periodically the voltage at the battery terminals,
    calculating, from said measured voltage, a slope value representative of the voltage variation versus time,
    comparing an absolute value of the slope at the end of each period with a predetermined full-charge threshold representative of full charge of the battery,
    and interrupting said charging by periodic rectangular current pulses when said absolute value of the slope is greater than or equal to said full-charge threshold.

2. The method according to claim 1, wherein the full-charge threshold is equal to 300mV/s.

3. The method according to claim 1, wherein said charging phase comprises before charging by periodic rectangular current pulses,
    charging said battery at a constant current,
    measuring periodically a voltage at the battery terminals,
    calculating, from said measured voltage, a slope value representative of the voltage variation versus time,
    comparing an absolute value of the slope with a predetermined range,
    and switching to charging by periodic rectangular current pulses when the absolute value of the slope enters said predetermined range.

4. The method according to claim 3, wherein the predetermined range is comprised between 1mV/s and 6mV/s.

5. The method according to claim 1, comprising before the charging phase, a prior phase of estimating the state of charge of the battery, said prior phase of estimating the state of charge comprising:
    applying a few periodic rectangular test current pulses alternately taking the first amplitude during the first period and the second amplitude during the second period,
    measuring periodically the voltage at the battery terminals,
    calculating, from said measured voltage, the voltage slope value,
    comparing the absolute value of the slope at the end of each period with said full-charge threshold,
    and switching to charging phase when said absolute value of the slope (P) is lower than said full-charge threshold.

6. A method for managing charging of a rechargeable battery, comprising at least one charging phase and a prior phase of estimating the state of charge of the battery, said prior phase of estimating the state of charge comprising:
    applying a few periodic rectangular test current pulses alternately taking the first amplitude during the first period and the second amplitude during the second period,
    measuring periodically a voltage at the battery terminals,
    calculating, from said measured voltage, a voltage slope value representative of the variation of the voltage versus time,
    comparing the absolute value of the slope at the end of each period with a predetermined full-charge threshold,
    and switching to charging phase when said absolute value of the slope is lower than said full-charge threshold.

* * * * *